(12) United States Patent
Roh

(10) Patent No.: US 9,392,579 B2
(45) Date of Patent: Jul. 12, 2016

(54) RESOURCE ALLOCATION METHOD AND APPARATUS OF BASE STATION IN WIRELESS COMMUNICATION SYSTEM

(71) Applicant: Samsung Electronics Co. Ltd., Suwon-si, Gyeonggi-do (KR)

(72) Inventor: Kwanhee Roh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 13/724,751

(22) Filed: Dec. 21, 2012

(65) Prior Publication Data

US 2013/0163541 A1 Jun. 27, 2013

(30) Foreign Application Priority Data

Dec. 26, 2011 (KR) .................. 10-2011-0141948

(51) Int. Cl.
*H04W 72/04* (2009.01)
*H04W 72/10* (2009.01)
*H04W 72/12* (2009.01)

(52) U.S. Cl.
CPC .......... *H04W 72/04* (2013.01); *H04W 72/0413* (2013.01); *H04W 72/10* (2013.01); *H04W 72/1247* (2013.01); *H04W 72/1284* (2013.01)

(58) Field of Classification Search
USPC ............. 370/230–235, 236–236.2, 329–337, 370/438–439
See application file for complete search history.

(56) References Cited

U.S. PATENT DOCUMENTS

2007/0070894 A1* 3/2007 Wang et al. ................. 370/230
2013/0294372 A1* 11/2013 Ishii et al. .................... 370/329

OTHER PUBLICATIONS

French, Ted, Ignore Zeros when Finding the Average in Excel (2010), http://spreadsheets.about.com/od/excel2010functions/qt/2010-03-13-excel-2010-average-function.htm.*

* cited by examiner

*Primary Examiner* — Michael Thier
*Assistant Examiner* — Eric Myers
(74) *Attorney, Agent, or Firm* — Jefferson IP Law, LLP

(57) ABSTRACT

A resource allocation method and a base station for shortening an operation for updating an average data rate in a per-user scheduling metric calculation in the wireless communication system adopting a Proportional Fairness scheduler are provided. The resource allocation method includes receiving, at a base station, a channel quality indicator from at least one mobile station to be allocated resources, calculating a data rate available for the at least one mobile station based on the channel quality indicator, calculating a scheduling metric by dividing the data rate by an average data rate of the at least one mobile station, determining a resource allocation priority based on the scheduling metric, allocating the resources to the at least one mobile station according to the resource allocation priority, and updating the average data rate of only the at least one mobile station allocated the resources.

6 Claims, 4 Drawing Sheets

RESOURCE ALLOCATION METHOD AND APPARATUS OF BASE STATION IN WIRELESS COMMUNICATION SYSTEM

PRIORITY

This application claims the benefit under 35 U.S.C. §119 (a) of a Korean patent application filed on Dec. 26, 2011 in the Korean Intellectual Property Office and assigned Serial No. 10-2011-0141948, the entire disclosure of which is hereby incorporated by reference.

BACKGROUND OF THE INVENTION

1. Field of the Invention

The present invention relates to a resource allocation method and apparatus of a base station in a wireless communication system. More particularly, the present invention relates to a resource allocation method and apparatus that is capable of shortening an operation for updating an average data rate in a per-user scheduling metric calculation in the wireless communication system adopting a Proportional Fairness scheduler.

2. Description of the Related Art

Mobile communication systems were originally developed to provide subscribers with voice communication services on the move. With the rapid advance of technologies, the mobile communication systems have evolved to support high speed data communication services as well as the standard voice communication services. However, the limited resource and user requirements for higher speed services in the current mobile communication systems spurs the evolution to more advanced mobile communication systems.

Meanwhile, the proportional fairness scheduler allocates resources to candidate terminals (hereinafter, interchangeably referred to as "Mobile Station" and "MS") in descending order of the scheduling matric calculated based on the currently available data rate and the average data rate assigned to the MS.

In a system of the related art, when the average data rate assigned to an MS is to be updated, the average data rates of all MSs with and without assigned resources is also updated. If the average data rates of all candidate MSs are updated in a certain period for which the number of MSs assigned resources is small, this causes degradation of system efficiency.

Therefore, a need exists to provide a resource allocation method and apparatus that is capable of shortening an operation for updating an average data rate for use in calculating a per-user scheduling metric in a wireless packet data communication system adopting a proportional fairness scheduler.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problem and/or disadvantages and to provide at least the advantages described below. Accordingly, an aspect of the present invention is to provide a resource allocation method and apparatus that is capable of shortening an operation for updating an average data rate for use in calculating a per-user scheduling metric in a wireless packet data communication system adopting a proportional fairness scheduler.

Another aspect of the present invention is to provide a resource allocation method and apparatus that is capable of reducing system complexity by updating the average data rate of only the mobile stations allocated resources.

In accordance with an aspect of the present invention, a resource allocation method of a base station in a wireless communication system is provided. The resource allocation method includes receiving, at a base station, a channel quality indicator from at least one mobile station to be allocated resources, calculating a data rate available for the at least one mobile station based on the channel quality indicator, calculating a scheduling metric by dividing the data rate by an average data rate of the at least one mobile station, determining a resource allocation priority based on the scheduling metric, allocating the resources to the at least one mobile station according to the resource allocation priority, and updating the average data rate of only the at least one mobile station allocated the resources.

In accordance with another aspect of the present invention, a base station for allocating resource to mobile stations in a wireless communication system is provided. The base station includes a radio communication unit which transmits and receives signals to and from mobile stations, a modem which demodulates the signals received from the mobile stations to extract channel quality identifiers, and a resource allocation scheduler which calculates a data rate available for at least one mobile station based on a channel quality indicator, calculates a scheduling metric by dividing the data rate by an average data rate of the at least one mobile station, determines a resource allocation priority based on the scheduling metric, allocates resources to the at least one mobile station according to the resource allocation priority, and updates the average data rates of only the at least one mobile station allocated the resources.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
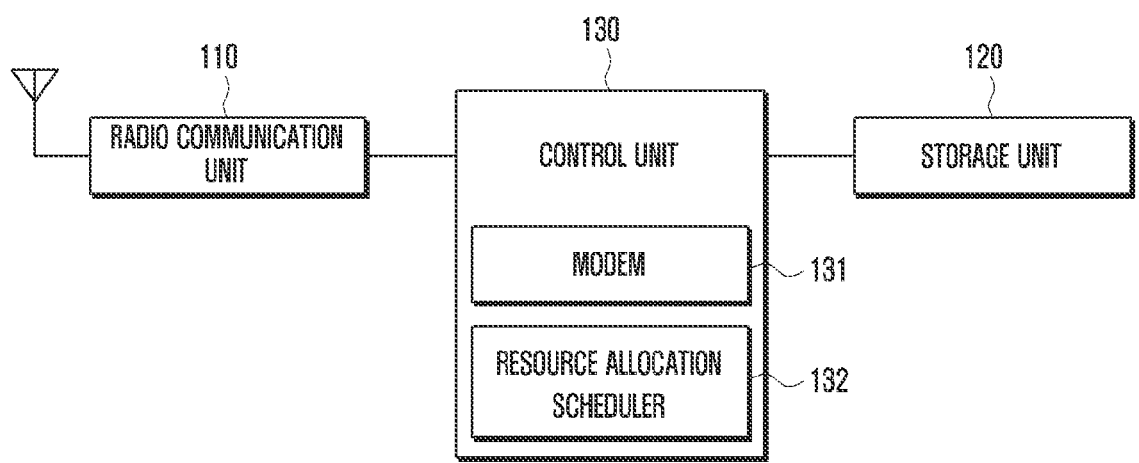
FIG. 1 is a block diagram illustrating a configuration of a base station according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A proportional fairness scheduler grants a resource allocation priority to candidate Mobile Stations (MSs) in an order of highest to lowest of a scheduling metric value calculated with Equation (1):

$$PF\_Metric\ [k] = R(k,n)/T\text{avg}(k,n) \quad \text{Equation (1)}$$

where k denotes a candidate MS index, n denotes time, and R denotes channel quality as a data rate available with resources allocated to an MS k. Also, Tavg denotes an average data rate allocated to the MS k, i.e., resource amount allocated to the MS for a time period T.

As gleaned from Equation (1), the better the channel quality is and the lower the allocated average data rate is, the higher the scheduling metric (PF_Metric) value is. The higher the scheduling matric value is, the earlier the MS can be allocated the resource The proportional fairness scheduling scheme is capable of improving the system throughput as well as guaranteeing scheduling allocation fairness. In the proportional fairness scheduling, the average data rate (Tavg) is updated with Equation (2):

$$T_{avg}(k, n) = \begin{cases} \dfrac{T-1}{T} T_{avg}(k, n-1) + \dfrac{1}{T} R(k, n), & \text{terminal with allocated resource} \\ \dfrac{T-1}{T} T_{avg}(k, n-1) & \text{terminal without allocated resource} \end{cases} \quad \text{Equation (2)}$$

where T denotes a size of a window for calculating an average of the average data rate.

In the proportional fairness scheduling, the average data rate update is performed for all the MSs with and without allocated resources and thus the average data rate update complexity increases in proportion to the number of MSs. Meanwhile, since the allocated resources are restricted in spite of the increase of the number of the MSs with allocated resources, the number of MSs that are actually allocated the resources does not increase.

Although the number of MSs that are actually allocated resources is small during a Transmission Time Interval (TTI), the average data rates of all resource allocation candidate MSs is updated. Accordingly, if the number of resource allocation candidate MSs exceeds a predetermined value, the system having a restricted capability fails to process the overload.

Exemplary embodiments of the present invention have been conceived to address this problem and propose a method for reducing the average data rate update complexity of the system in such a way as updating the average data rate of only the MSs with allocated resources.

FIG. 1 is a block diagram illustrating a configuration of a base station according to an exemplary embodiment of the present invention.

Referring to FIG. 1, a base station according to an exemplary embodiment of the present invention includes a radio communication unit 110, a storage unit 120, and a control unit 130.

The radio communication unit 110 is responsible for transmitting and receiving control signals and data. The radio communication unit 110 is capable of including a Radio Frequency (RF) transmitter for up-converting and amplifying the signal to be transmitted and an RF receiver for low noise amplifying and down-converting the received signal. The radio communication unit is also capable of delivering the control and data signals received through a radio channel to the control unit 160 and transmitting the data output by the control unit 160 through the radio channel. The radio communication unit 110 according to an exemplary embodiment of the present invention is capable of receiving a Channel Quality Indicator (CQI) transmitted by the MS through a dedicated uplink feedback channel and delivers the received CQI to the control unit 130.

The storage unit 120 is responsible for storing programs and data associated with the operation of the base station. Particularly, when the average data rate of the MS is to be updated for use in the proportional fairness scheduling of the base station, the storage unit 120 is capable of storing programs for controlling the update of the average data rate of only the MSs with allocated resources.

The control unit 130 is responsible for controlling overall operations of the internal functional blocks of the base station. Particularly, in an exemplary embodiment of the present invention, the control unit 130 is capable of controlling the update of the average data rate of only the MSs allocated resources for use in the proportional fairness scheduling. In order to accomplish this, the control unit 130 is capable of including a modem 131 and a resource allocation scheduler 132.

The modem is responsible for demodulating incoming signals received by the radio communication unit 110 and modulating outgoing signals to be transmitted through the radio communication unit 110. According to an exemplary embodiment of the present invention, if the CQI information transmitted by a MS is received, the modem 131 performs demodulation on the CQI and transfers the CQI to the resource allocation scheduler 132.

The resource allocation scheduler 132 calculates the data rate available for each candidate MS on the given resource based on the CQI information fed back by each MS. The resource allocation scheduler 132 calculates the scheduling metric by dividing the calculated available data rate into an average data rate for each MS. The resource allocation scheduler allocates the resources to the candidate MS having the highest scheduling metric value first.

According to an exemplary embodiment of the present invention, the resource allocation scheduler 132 updates the average data rate for only the MSs that are actually allocated the resources. The average data rate for the MSs with and without allocated resources is updated according to Equation (3):

$$T_{avg}(k, n) = \begin{cases} T_{avg}(k, n-1) + \frac{1}{T-1} R(k, n), & \text{terminal with allocated resource} \\ T_{avg}(k, n-1), & \text{terminal without allocated resource} \end{cases} \quad \text{Equation (3)}$$

where k denotes a candidate MS index, n denotes time, R denotes channel quality as a data rate available with resources allocated to MS k, and Tavg denotes an average data rate allocated to the MS k.

T denotes a size of the window for calculating the average of the average data rate and T>1. As shown in Equation (3), the data rate update is performed with 1 division operation and 1 addition operation for the MS allocated resources and no extra operation for the MS not allocated any resources since the average data rate of the previous time point is used.

In the related-art method, however, the data rate update is performed with 2 divisions, 1 multiplication, and 1 addition for the MS allocated resources while 1 division and 1 multiplication for the MS allocated no resources, as shown in Equation (2).

According to an exemplary embodiment of the present invention, since the data rate update is performed only for the MSs allocated resources at the current scheduling occasion as shown in Equation (3), the average data rate increases gradually as the number of resource allocations increases. In this case, the scheduling metric for the MS decreases gradually so as to be ruled out in priority assignment for resource allocation.

In order to address this, the resource allocation method according to an exemplary embodiment of the present invention decreases the average data rates of all the MSs at a predetermined period using Equation (4):

$$T_{avg}(k, n) = T_{avg}(k, n-1) \left( \frac{T-1}{T} \right)^N \quad \text{Equation (4)}$$

where k denotes a candidate MS index, n denotes time, Tavg denotes an average data rate allocated to MS k, T denotes a window size for calculating the average of the average data rate, N denotes a Tavg update period of all candidate MSs allocated resources.

In an exemplary embodiment of the present invention, the average data rates of all the MSs are updated at every N resource allocations to prevent the average data rate of the MS allocated resources from diverging.

In the case where T is sufficiently large, Equation (4) can be approximated as shown in Equation (5) and thus the complexity caused by the exponential operation can be further reduced.

$$T_{avg}(k, n) \approx T_{avg}(k, n-1) \left( \frac{T-N}{T} \right) \quad \text{Equation (5)}$$

Figure 2:
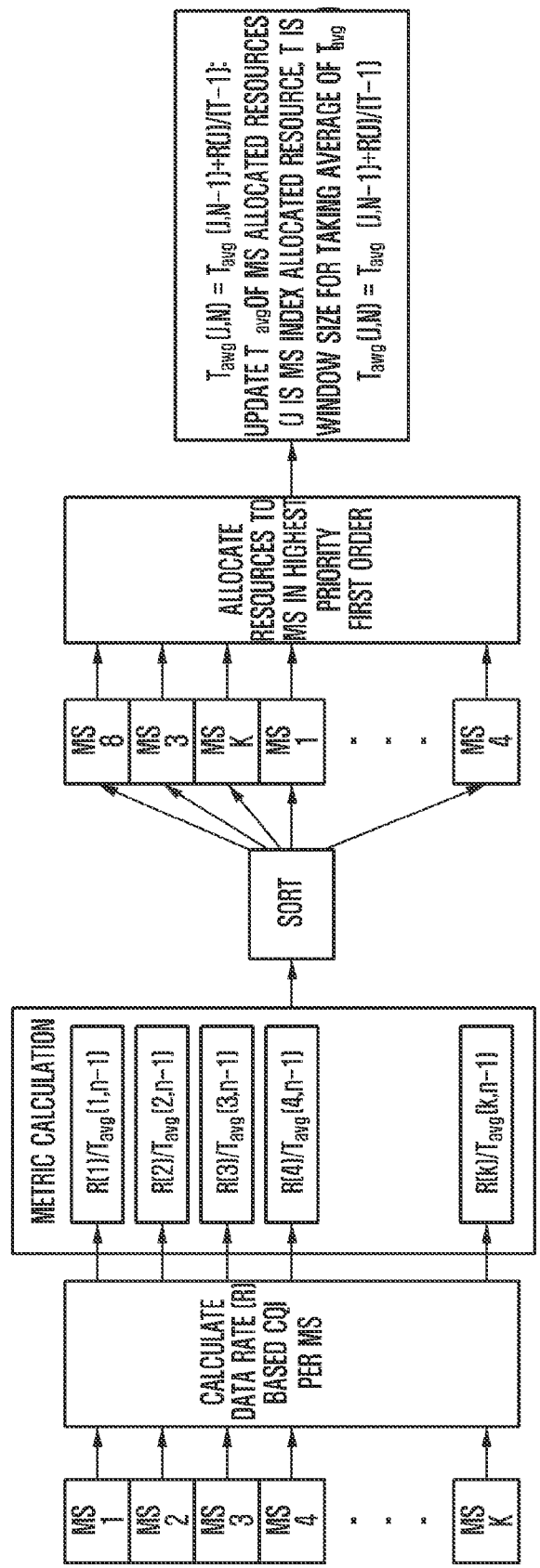
FIG. 2 is a diagram illustrating a process of allocating resources and updating an average data rate for individual Mobile Stations (MSs) in a resource allocation apparatus according to an exemplary embodiment of the present invention.

A description is made of the procedure for the resource allocation scheduler 132 to allocate resources to the MS and update the average data rate of each MS with reference to FIG. 2.

FIG. 2 is a diagram illustrating a process of allocating resources and updating an average data rate for individual MSs in a resource allocation apparatus according to an exemplary embodiment of the present invention.

Referring to FIG. 2, the resource allocation scheduler 132 updates the data rate of each MS based on the corresponding MS's CQI. The resource allocation scheduler 132 calculates the scheduling metric of each MS according to Equation (1). The resource allocation scheduler 132 sorts the MSs in a descending order of scheduling metric and allocates the resources to the MSs in the highest scheduling metric-first order. The resource allocation scheduler 132 updates the average data rates of only the resource-allocated MSs.

Figure 3:
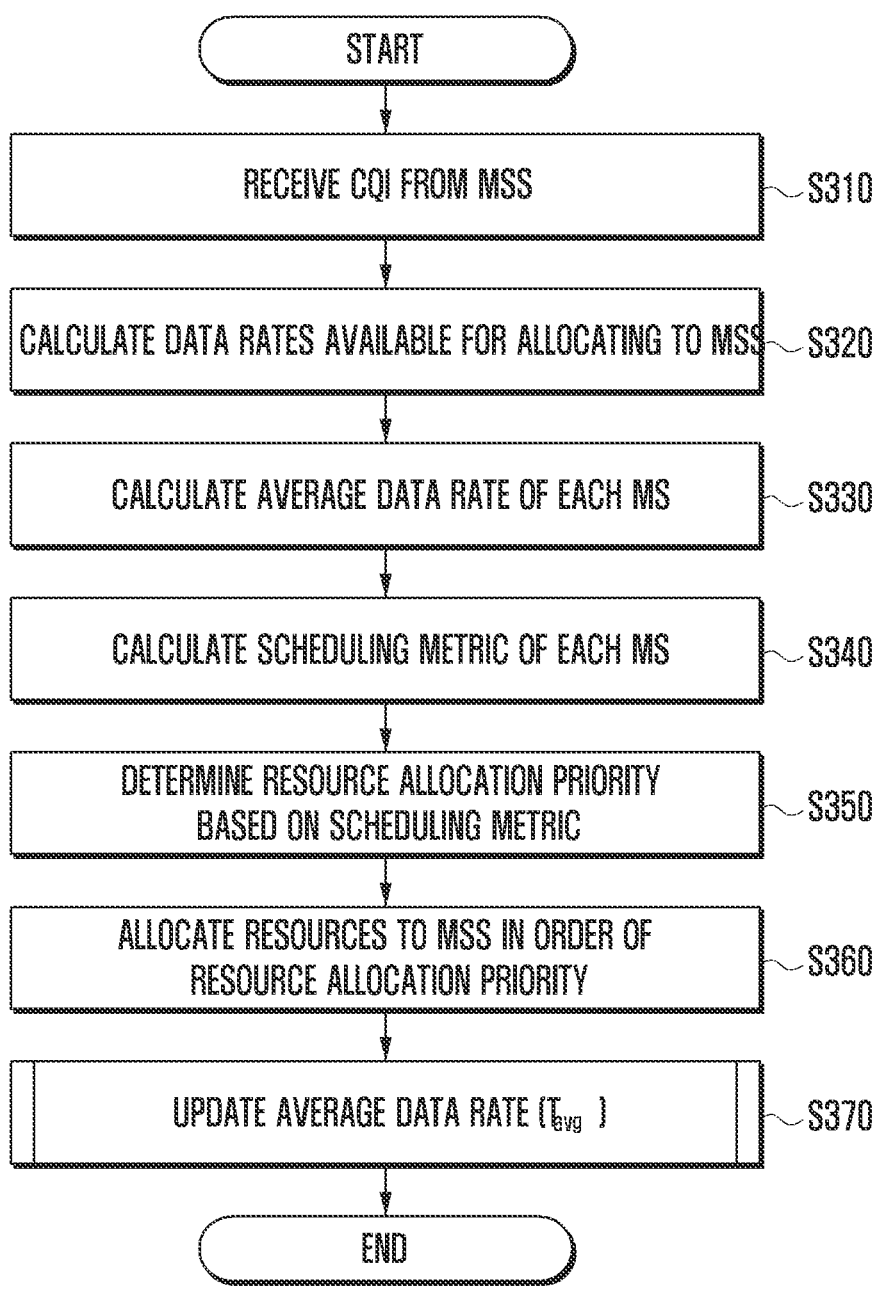
FIG. 3 is a flowchart illustrating a resource allocation and average data rate update procedure of a base station in a resource allocation method according to an exemplary embodiment of the present invention.

FIG. 3 is a flowchart illustrating a resource allocation and average data rate update procedure of a base station according to an exemplary embodiment of the present invention.

Referring to FIG. 3, the radio communication unit 110 receives the CQI signals transmitted by the individual MSs and transfers the CQI signals to the modem 131 at step S310. The modem 131 performs demodulation on the signals to transfer the CQIs to the resource allocation scheduler 132.

The resource allocation scheduler 132 calculates the data rate available for the respective candidate MSs on the given resources based on the CQIs at step S320. Next, the resource allocation scheduler 132 calculates the average data rate of each MS at step S330.

The resource allocation scheduler 132 divides the available data rate by the average data rate per MS to obtain the scheduling metric of each MS at step S340. Next, the resource allocation scheduler 132 determines the resource allocation priorities of the individual MSs based on the per-MS scheduling metrics at step S350.

Next, the resource allocation scheduler 132 allocates resources to the MSs in the order of highest scheduling metric first at step S360.

Finally, the resource allocation scheduler 132 updates the average data rate (Tavg) for use in the calculation of the scheduling metric for each MS at step S370. According to an exemplary embodiment of the present invention, the resource allocation scheduler 132 updates the average data rates of the MSs which have been allocated resources and a detailed description thereon is made with reference to FIG. 4.

Figure 4:
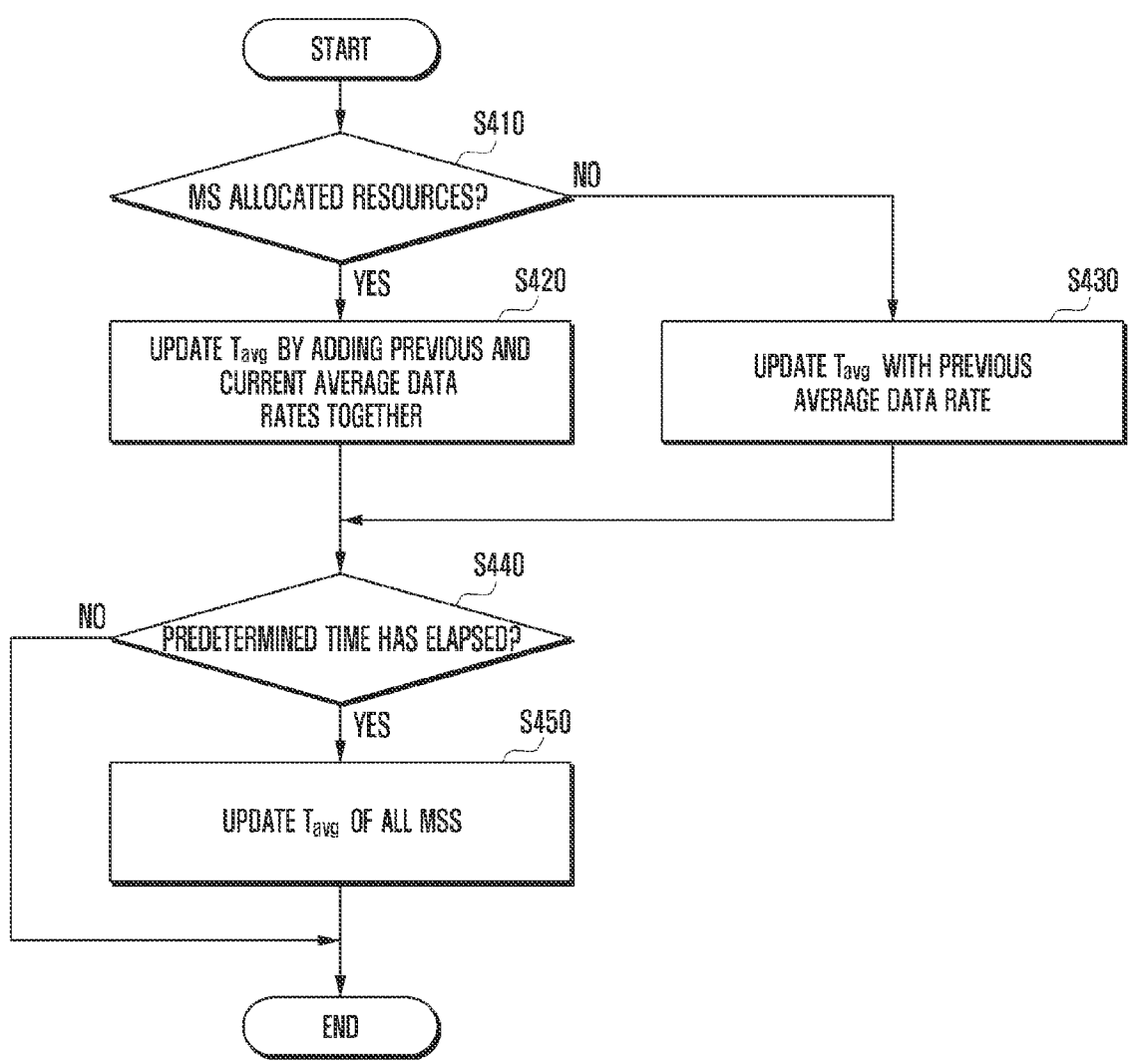
FIG. 4 is a flowchart illustrating an average data rate update step, such as the average data rate update step S370 of FIG. 3, according to an exemplary embodiment of the present invention.

FIG. 4 is a flowchart illustrating an average data rate update, such as the average data rate update in step S370 of FIG. 3, according to an exemplary embodiment of the present invention.

The resource allocation scheduler 132 determines whether the MS is the update-candidate MS allocated resources at the current occasion at step S410.

If it is determined that the MS is the update-candidate MS with allocated resources, the resource allocation scheduler updates the average data rate of the MS using the first formula of Equation (2) at step S420. That is, the resource allocation scheduler 132 adds a value obtained by multiplying a predetermined constant with the average data rate of the MS at the current occasion to the average data rate at the previous occasion to update the average data rate.

Otherwise, if it is determined that the MS is the MS with no allocated resources, the resource allocation scheduler 132 updates the average data rate of the MS using the second formula of Equation (2) at step S430. That is, the resource allocation scheduler 132 uses the average data rate at the previous occasion as the average data rate at the current occasion.

Next, the resource allocation scheduler 132 determines whether a predetermined time duration for reducing the average data rates of all MSs has elapsed at step S440. If the predetermined time duration has elapsed, the resource allocation scheduler 132 updates the average data rates of all the MSs according to Equation 4 at step S450. This is to prevent the MSs, which have allocated resources of which their scheduling metric decreases due to the gradual increase of their data rates as the number of resource allocation times increases, from being ruled out in priority assignment for resource allocation.

As described above, the resource allocation method and apparatus of the exemplary embodiments of the present invention is configured to update the average data rate of only the MSs which have been actually allocated resources in the average data rate update procedure for the proportional fairness scheduling, thereby reducing the system complexity efficiently.

Although exemplary embodiments of the present invention have been described in detail hereinabove with specific terminology, this is for the purpose of describing particular exemplary embodiments only and not intended to be limiting of the invention. While particular exemplary embodiments of the present invention have been illustrated and described, it would be obvious to those skilled in the art that various other changes and modifications can be made without departing from the spirit and scope of the invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A resource allocation method of a base station in a wireless communication system, the method comprising:
   receiving a channel quality indicator from a mobile station;
   acquiring, based on the channel quality indicator, a data rate if a resource is currently allocated to the mobile station;
   obtaining an average data rate indicating a resource amount allocated to the mobile station during a time period;
   reducing the average data rate of the mobile station after a predetermined time period according to a following equation:

$$T_{avg}(k, n) = T_{avg}(k, n-1)\left(\frac{T-1}{T}\right)^N$$

where k denotes an index of the mobile station, n denotes time, Tavg denotes the average data rate allocated to the mobile station, T denotes the time period, and N denotes an update period of the average data rate;
   calculating a scheduling metric by dividing the acquired data rate by the average data rate;
   determining a resource allocation priority of the mobile station based on the scheduling metric; and
   allocating the resource to the mobile station according to the resource allocation priority,
   wherein the obtaining comprises:
   if the resource is currently allocated to the mobile station, updating the average data rate using the acquired data rate which is acquired based on the channel quality indicator, and
   if the resource is not currently allocated to the mobile station, not updating the average data rate.

2. The method of claim 1, wherein the obtaining comprises maintaining the average data rate, which is obtained at a previous time point, of the mobile station if the resource is not currently allocated to the mobile station.

3. The method of claim 1, wherein the obtaining comprises:
   calculating the average data rate of the mobile station using a following equation:

$$T_{avg}(k, n) = \begin{cases} T_{avg}(k, n-1) + \dfrac{1}{T-1}R(k, n), & \text{terminal with allocated resource} \\ T_{avg}(k, n-1), & \text{terminal without allocated resource} \end{cases}$$

where k denotes an index of the mobile station, n denotes time, R denotes the acquired data rate allocated to the mobile station, Tavg denotes the average data rate allocated to the mobile station, and T denotes the time period.

4. A base station for allocating resources to mobile stations in a wireless communication system, the base station comprising:
   a radio communication unit which transmits and receives signals to and from a mobile station;
   a modem which demodulates the signals received from the mobile station to extract a channel quality indicator; and
   a resource allocation scheduler which acquires, based on the channel quality indicator, a data rate if a resource is currently allocated to the mobile station, obtains an average data rate indicating a resource amount allocated to the mobile station during a time period, calculates a scheduling metric by dividing the acquired data rate by the average data rate, determines a resource allocation priority of the mobile station based on the scheduling metric, and allocates the resource to the mobile station according to the resource allocation priority,
   wherein the resource allocation scheduler obtains the average data rate by updating the average data rate using the acquired data rate which is acquired based on the channel quality indicator if the resource is currently allocated to the mobile station, and not updating the average data rate if the resource is not currently allocated to the mobile station, and
   wherein the resource allocation scheduler reduces the average data rate of the mobile station after a predetermined time period according to a following equation:

$$T_{avg}(k, n) = T_{avg}(k, n-1)\left(\frac{T-1}{T}\right)^N$$

where k denotes an index of the mobile station, n denotes time, Tavg denotes the average data rate allocated to the mobile station, T denotes the time period, and N denotes an update period of the average data rate.

5. The base station of claim 4, wherein the resource allocation scheduler maintains the average data rate, which is obtained at a previous time point, of the mobile station if the resource is not currently allocated to the mobile station.

6. The base station of claim 4, wherein the resource allocation scheduler obtains the average data rate by calculating the average data rate of the mobile station using a following equation:

$$T_{avg}(k, n) = \begin{cases} T_{avg}(k, n-1) + \frac{1}{T-1} R(k, n), & terminal\,with\,allocated\,resource \\ T_{avg}(k, n-1), & terminal\,without\,allocated\,resource \end{cases}$$

where k denotes an index of the mobile station, n denotes time, R denotes the acquired data rate allocated to the mobile station, Tavg denotes the average data rate allocated to the mobile station, and T denotes the time period.

* * * * *